United States Patent [19]

Puschett et al.

[11] Patent Number: 5,077,078

[45] Date of Patent: Dec. 31, 1991

[54] SURFACE MODIFICATION OF PLASTIC OPTICAL FIBERS

[75] Inventors: Jules B. Puschett; Krzysztof Matyjaszewski, both of Pittsburgh, Pa.

[73] Assignee: University of Pittsburgh of the Commonwealth System of Higher Education, Pittsburgh, Pa.

[21] Appl. No.: 493,592

[22] Filed: Mar. 14, 1990

[51] Int. Cl.$^5$ .............................................. B05D 5/06
[52] U.S. Cl. ...................................... 427/2; 427/163; 427/164; 427/165; 427/301; 427/337; 427/419.1
[58] Field of Search .................... 427/2, 163, 165, 337, 427/301, 419.1, 164

[56] References Cited

U.S. PATENT DOCUMENTS

| | | | |
|---|---|---|---|
| 4,194,877 | 3/1980 | Peterson | 8/4 |
| 4,200,110 | 4/1980 | Peterson et al. | 128/634 |
| 4,240,796 | 12/1984 | Nakanishi | 427/2 |
| 4,560,248 | 12/1985 | Cramp et al. | 350/96.34 |
| 4,568,518 | 2/1986 | Wolfbeis et al. | 422/56 |
| 4,803,049 | 2/1989 | Hirschfeld et al. | 422/58 |
| 4,834,496 | 5/1989 | Blyler, Jr. et al. | 350/96.29 |
| 4,859,538 | 8/1989 | Ribi | 427/2 |
| 4,883,338 | 11/1989 | Abe et al. | 350/96.34 |
| 4,886,338 | 12/1989 | Yafuso et al. | 350/96.29 |

OTHER PUBLICATIONS

A. Akelah, M. Hassanein, A. Selim, & E. R. Kenawy, "Snythesis and Chemical Modificaton of Poly (Methylmethacrylate) Resins," *Polymer Preprints*, vol. 27 (1), (1986) pp. 468-469.

L. Feistel, Dr. Krauss, & G. Schwachula, E. German Patent No. 212,258, issued Aug. 8, 1984, appearing in Chemical Abstracts, vol. 102 (1985).

V. M. Balakin, A. G. Tesler, V. S. Talankin, Vysokomol Soedin, Ser. B., 26 (5), appearing in Chemical Abstracts, vol. 101 (1984).

J. M. J. Frechet, A. J. Hagen, C. Benezra, & A. Cheminat, "Polymeric Separation Media: Binding of 2,β-Unsaturated Carbonyl Compounds to Insoluble Resins through Michael Additions or Chelation of Derivatives," Pure & Appl. Chem., vol. 54, No. 11 (1982), pp. 2181-2188.

P. Hodge & D. C. Sherrington, Eds., *Polymer-Supported Reactions in Organic Synthesis*, John Wiley & Sons, New York (1980).

D. T. Clark & H. R. Thomas, "Applications of ESCA to Polymer Chemistry XVII", Journal of Polymer Science, Polymer Chemistry Edition, vol. 16 (1978), pp. 791-820.

C. U. Pittman, Jr., & G. O. Evans, "Polymer-Bound Catalysts and Reagents," *ChemTech* (1973), pp. 560-566.

K. Yang, J. G. Cannon, & J. G. Rose, "N-Butyllithium in Aminolysis and Ammonolysis of Esters," *Tetrahedron Letters*, No. 21 (1970), pp. 1791-1794.

R. B. Merrifield, "Solid Phase Peptide Synthesis. I. The Synthesis of a Tetrapeptide", J. Amer. Chem. Soc., vol. 85, (Jul. 20, 1963), pp. 2149-2154.

"Homogeneous and Heterogeneous Modification of Poly(MethylMethacrylate) with Ethylene Diamine" in *Polymer Preprints*, vol. 30, No. 1 (Apr. 1989) by B. Karandikar, J. Puschett, & K. Matyjaszewski.

*Primary Examiner*—Janyce Bell
*Attorney, Agent, or Firm*—Arnold B. Silverman; Craig G. Cochenour; Suzanne Kikel

[57] ABSTRACT

A method of chemically modifying the poly (methyl methacrylate) (hereinafter "PMMA") clad surface of an optical fiber to introduce amino groups. N-butyl lithium in a suitable organic solvent with ethylene diamine is applied to the clad surface of the optical fiber in a substantially oxygen-free atmosphere, such as nitrogen, at approximately 10° C. to 40° C. for about one to two hours. A pH-sensitive dye with isothiocyanate functionality can be bounded to the modified clad surface resulting in a pH sensor based on fiber optics.

16 Claims, 3 Drawing Sheets

SURFACE MODIFICATION OF PLASTIC OPTICAL FIBERS

BACKGROUND OF THE INVENTION

1. Field of the Invention

The invention relates to a pH-sensor based on fiber optics. More specifically, the invention is directed to the chemical modification of the poly (methyl methacrylate) clad surface of an optical fiber to introduce amino groups, and thereafter, binding a pH sensitive dye to the clad surface.

2. Description of the Prior Art

Functional polymers find numerous applications as supports in solid phase synthesis, as discussed by R. B. Merrifield, J. Amer. Chem. Soc., 85, 2149 (1963); in reagents, as discussed by P. Hodge and D. C. Sherrington, Eds., "Polymer Supported Reactions in Organic Synthesis", John Wiley, New York, 1980: in Chromatography as discussed by J. M. J. Fretchet, A. J. Hagen, C. Benezra, and A. Cheminat, Pure Appl. Chem., Volume 54, 2181 (1982); and in catalysts as discussed by C. U. Pittman and G. Evans, Chem. Tech., 560 (1973).

There are two general methods for introducing functional groups into polymers. First, by polymerization of the corresponding monomers and second, by chemical modification of the preformed polymers. For introducing functional groups on surfaces, only the latter method is suitable. The most widely studied chemical modification reaction of poly (methyl methacrylate) (PMMA) has been hydrolysis to poly(methacrylic acid), while research on introducing other functionalities in PMMA has received much less attention.

This subject is discussed by L. Feistel, D. Krauss, and G. Schwachula in Ger. Patent No. 212,258 (1984); by A. Akelah, M. Hassanein, A. Selim, and E. R. Keanwy in Polym. Prep., Vol. 27 (1), 468 (1986); and by V. M. Balankin, A. G. Tesler, and V. S. Talankin, Vysokomol, Soedin, Ser. B., Vol. 26, 384 (1984). In the work of the invention on the development of a pH sensor based on fiber optics, it was of considerable interest to chemically modify the surface of the PMMA cladding of an optical fiber to introduce amino groups. A pH-sensitive dye with isothiocyanate functionality, which has been developed in the invention, would then be bound on the optical fiber utilizing the amino groups located at the surface of the fiber. Reactions between isothiocyanates and primary amines are very fast and should be completed in a relatively short time even under heterogeneous conditions. A literature review revealed that procedures used previously in aminolysis of esters were unsuitable, because they either employed solvents that would dissolve the fiber or employed temperature conditions that would destroy the fiber.

SUMMARY OF THE INVENTION

The invention provides a method for the development of pH sensor based on fiber optics in an aminolysis of esters. The surface of the poly (methyl methacryalte) PMMA cladding of an optical fiber is chemically modified to introduce amino groups. A pH sensitive dye with isothiocyanate functionality is bound on the optical fiber utilizing the amino groups located at the surface of the fiber. Reactions between isothiocyanates and primary amines are relatively fast and are usually completed in a relatively short time even under heterogeneous conditions. This modification is carried on in solution or in a heterogeneous phase, i.e. on the surface of PMMA cladding of the optical fiber. As discussed hereinabove, N-lithio ethylene diamine is formed in situ by the reaction of n-butyl lithium with excess ethylene diamine, as the aminolyzing agent. The reaction occurs at room temperature and excellent conversion efficiency is obtained.

It is an object of the invention to provide a method for the aminolysis of esters which uses a solvent and/or temperature conditions which substantially decrease or eliminate the chance of the fiber from being dissolved or destroyed.

It is a further object of the invention to chemically modify a surface of a poly (methyl methacrylate) PMMA cladding to introduce amino groups.

It is a further object to bind the surface of the PMMA cladding of the preceding object with a pH sensitive dye with an isothiocyanate functionality.

It is a further object of the invention to provide a pH sensor developed through an aminolysis of esters and to do so in a relatively short period of time.

It is a further object of the invention to chemically modify a PMMA by aminolysis in solution or in an heterogeneous phase, i.e. on the surface of a PMMA cladding of an optical fiber.

It is a further object of the invention to use a N-lithio ethylene diamine formed in situ by the reaction of n-butyl lithium with excess ethylene diamine, as an aminolyzing agent.

It is a further object of the invention to alter existing fiber optics with PMMA cladding into a pH sensitive surface.

These and other objects of the invention will be more fully understood from the following description of the invention on reference to the illustrations appended thereto.

DESCRIPTION OF A PREFERRED EMBODIMENT

Figure 1:
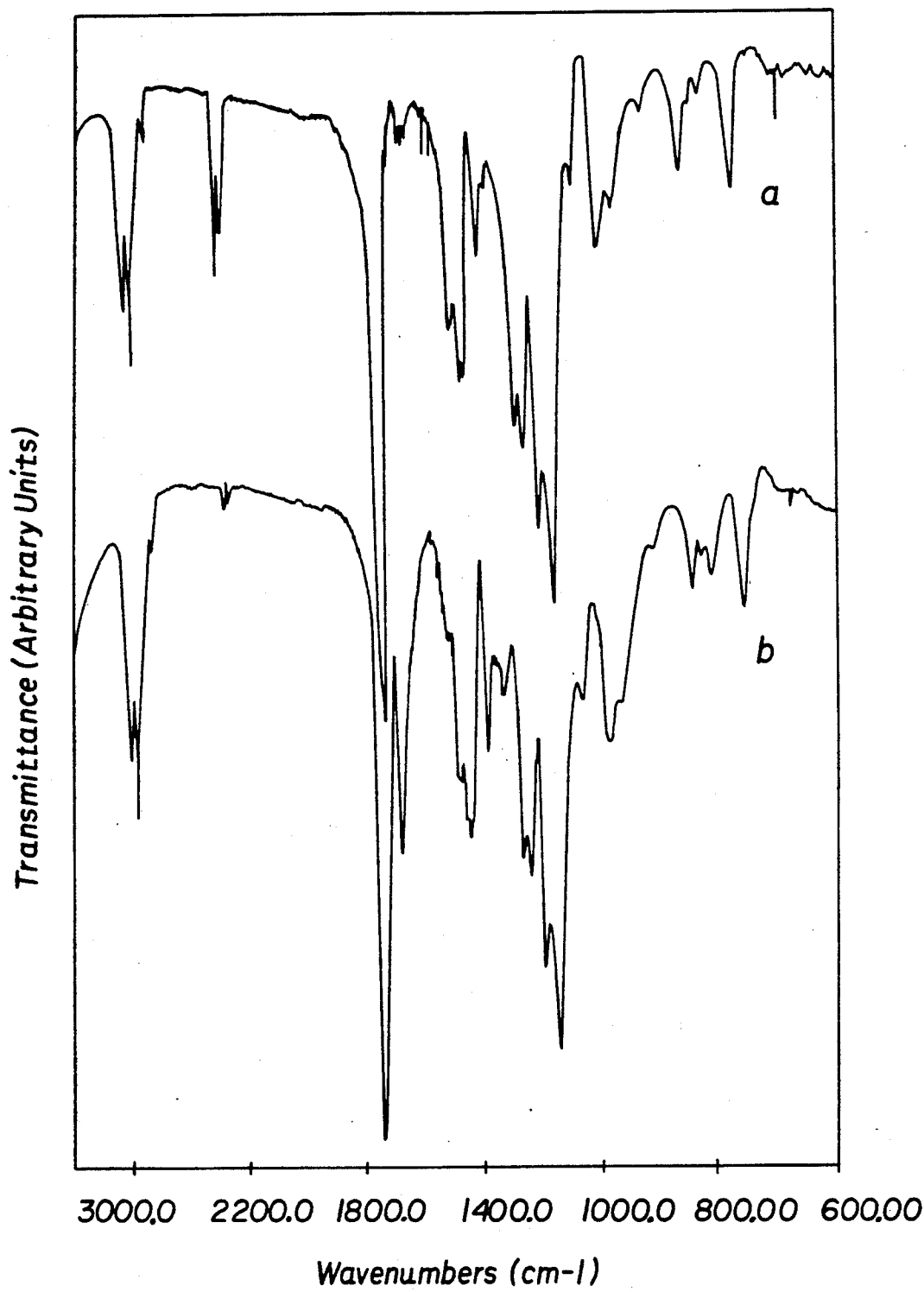
FIG. 1 shows a graph comparing the FTIR spectrum of PMMA and an aminolyzed product polymer (in KBr)

As used herein, "PMMA" means poly (methyl methacrylate). The invention involves the chemical modification of PMMA by aminolysis which could either be carried out in solution or in the heterogeneous phase, i.e., on the surface of PMMA cladding of the optical fiber. N-lithio ethylene diamine formed in situ by the reaction of n-butyl lithium with excess ethylene diamine, was the aminolyzing agent. The reaction occurred readily at room temperature and excellent conversion efficiency was obtained.

EXPERIMENTAL MATERIALS

Chemicals were purchased from Aldrich Chemical Company (Milwaukee, WI). THF was distilled from sodiumbenzophenone. Reagent grade methanol and diethyl ether were dried over $CaH_2$. N-butyl lithium solution in hexane was used as received. Ethylene diamine was distilled over calcium hydride and redistilled just prior to use. PMMA was prepared by free radical polymerization of methyl methacrylate at 70° C. for 2 hours in the presence of 0.5% AIBN. Optical fibers were supplied by General Fiber Optics Inc. (Cedar Grove, N.J.) and pertinent details are listed in Table 1. For surface modification, optical fibers were cleaned by soaking in 10% v/v aqueous methanol solution for 30 minutes and dried prior to use.

PROCEDURES

Solution Phase Aminolysis

A 50 ml three-neck round-bottom flask fitted with a condenser and two dropping funnels, provided with a stirrer bar, was flushed with nitrogen and flame dried. Dry nitrogen was passed continuously through the system. Ethylene diamine (50 mmol) and THF (10 ml) were transferred to the flask using syringes. N-butyl lithium (2.5 mmol in 10 ml hexane) was then added dropwise. During the n-butyl lithium addition step, the flask was kept at 20° C. using an ice water bath. After the reaction mixture turned blue, the solution of PMMA in THF (0.25 g/25 ml) was added dropwise. Following PMMA addition, the reaction mixture turned pale yellow. After 24 hour period, stirring was stopped and the reaction mixture poured in ether to precipitate the polymer, which was filtered, washed with 5% v/v methanol in ether several times and vacuum dried overnight.

Surface Aminolysis

The optical fiber is insoluble in the reaction medium comprising only of N-lithio ethylene diamine and ethylene diamine, therefore the aminolysis is limited to its surface i.e. the outer part of the PMMA cladding. N-butyl lithium in hexane (7.5 mmol) was reacted with ethylene diamine (50 mmol) under nitrogen atmosphere at 25° C. for 2 hours to yield a purple colored mixture. An optical fiber, 15 cm long was placed in a dry glass capillary tube, plugged at both ends with rubber septa and flushed with nitrogen. A small volume (1.5 ml) of viscous reaction mixture was transferred using a syringe to the capillary, which was then placed on shaker to enable good wetting of the fiber surface. After a desired period (2-5 minutes), the fiber piece was removed quickly, washed several times with cold water and dried. Several fiber pieces were modified accordingly.

Measurements

Elemental analysis was performed by Desert Analytics Inc. (Tucson, AZ). The IR spectra and NMR spectra were recorded on a Nicolet FTIR Model 5DXB spectrometer and a GE 300 spectrometer, respectively. ESCA measurements were made on an AEI Model ES 200 Electron Spectrometer.

RESULTS AND DISCUSSION

Solution Phase Aminolysis

N-lithioamine derivatives have been shown to be excellent reagents to promote aminolysis of esters that are otherwise resistant to aminolysis, as discussed by K. W. Yang, J. G. Cannon, and J. G. Rose, Tetrahed. Lett., Vol. 21, 1791 (1970). However, their use in aminolysis of acrylate ester polymers hitherto has not been reported. In a previous study on solution phase aminolysis of PMMA, the polymer was heated with ethylene diamine at elevated temperatures (70° C.-120° C.). This study was made by V. M. Balankin, A. G. Tester, and V. S. Talankin, Vysokomol, Soedin. Ser. B, Vol. 26, 384 (1984), which is discussed to some extent hereinabove. Because of our requirement that aminolysis be carried out at ambient temperature, such an approach was not suitable. In the present case, N-lithio ethylene diamine (la) was formed according to the following reaction:

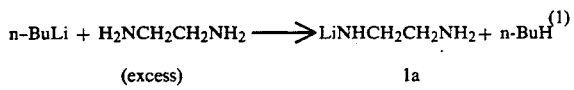

(excess)   1a

Following the aminolysis of PMMA by 1a, poly (methyl methacrylate-co-N-(2-amino ethyl)-methacrylamide) (1b) was obtained as outlined below:

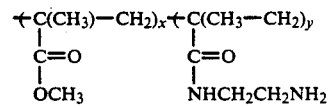

1b

The occurrence of aminolysis was confirmed by elemental analysis, IR spectra and NMR spectra. The IR spectrum of PMMA and product polymer are compared in FIG. 1. From the figure, the appearance of a carbonyl amide peak at 1676 cm$^{-1}$ is clearly evident, while the carbonyl ester peak at 1730 cm$^{-1}$ is reduced in intensity.

The NMR spectrum of the reaction product is consistent with the results of the IR spectrum. New signal peaks in the 2-3 ppm region due to —CH$_2$CH$_2$—moiety are seen, along with simultaneous shrinking of —OCH$_3$ signal peak at 3.1 ppm. The results of elemental and spectral analysis are consistent with the polymer structure, 1b. Thus, the use of N-lithio ethylene diamine effectively lowers the aminolysis reaction temperature. In a separate experiment, we found that when an initial mole ratio of 4:1 of n-butyl lithium to PMMA was employed, almost complete conversion to 1b was obtained within 6 hours. This indicates that N-lithioamine derivative also accelerates the reaction. The product polymer was found to be completely soluble in water which was expected because of increased hydrophilicity.

Surface Aminolysis

In earlier reports, such as those appearing in German Patent 212,258 and in Polym. Prep., discussed hereinabove, on heterogeneous phase aminolysis, PMMA was included as crosslinked macroreticular beads that possess large surface area and porosity. These beads are also known to swell in organic solvents. As a result, the reaction cannot be truly characterized as surface reaction. To the knowledge of the inventors, surface aminolysis of linear PMMA has not been studied before. Because the optical fibers were insoluble in the reaction medium containing N-lithio ethylene diamine, they retained their dimensional integrity. Therefore, the aminolysis primarily occurred on the fiber surface. It was determined that the fibers dipped in the reaction medium in excess of 10 minutes lost their light transmission property. Consequently, the N-lithioamine concentration was adjusted so that reasonable surface modification occurred within 5 minutes without significant loss of light transmission.

Figure 2:
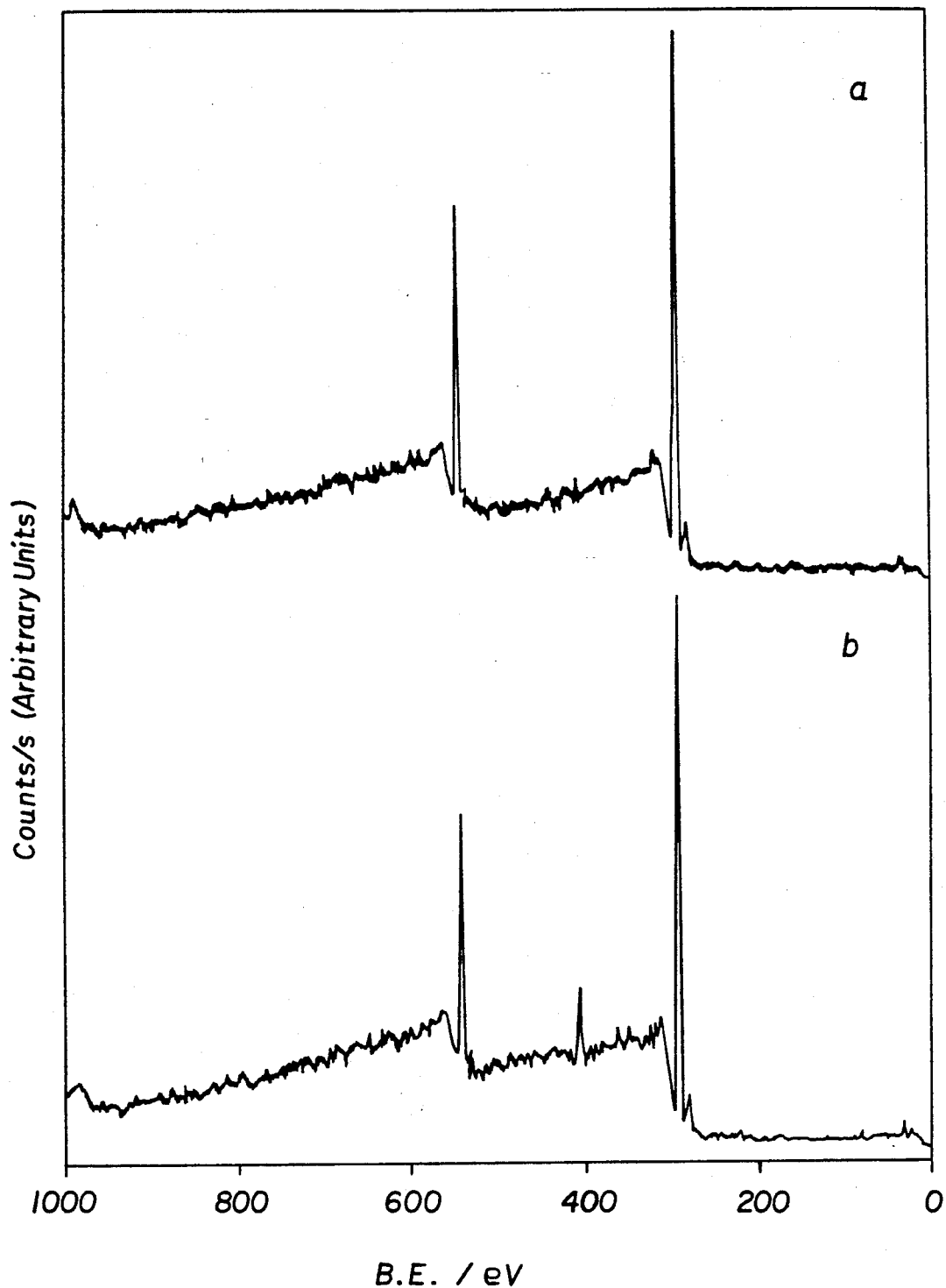
FIG. 2 is a graph showing a wide scan spectra covering 0-1000 eV region for the untreated ad aminolyzed PMMA clad optical fiber.

In order to confirm the occurrence of aminolysis on the fiber surface, ESCA measurements were carried out. Samples for ESCA were prepared by cutting 4 cm long strands from the parent fiber and glueing them next to each other on the probe support. FIG. 2 shows the wide scan spectra covering 0-1000 eV region for the untreated and aminolyzed PMMA clad optical fiber. The wide scan of untreated fiber shows two peaks near 540 eV and 300 eV representing $O_{ls}$ is core levels and $C_{ls}$ core levels respectively, consistent with the elemental makeup of PMMA. Similar results were also reported earlier for PMMA by Clark and Thomas in D. T. Clark and H. R. Thomas, J. Polym. Sci., Polym. Chem. Ed., Vol. 16, 791 (1978). In contrast, the wide scan of aminolyzed fiber shows $O_{ls}$ and $C_{ls}$ core level peaks plus another peak around 400 eV which is due to the $N_{ls}$ core levels, confirming the occurrence of reaction (2) on the fiber surface. The ESCA spectra of blank fibers showed no $N_{ls}$ peaks and was similar to that of PMMA. Independent check of fibers showed reasonable light transmission through the fibers, suggesting minimal damage to the core cladding interface.

Figure 3:
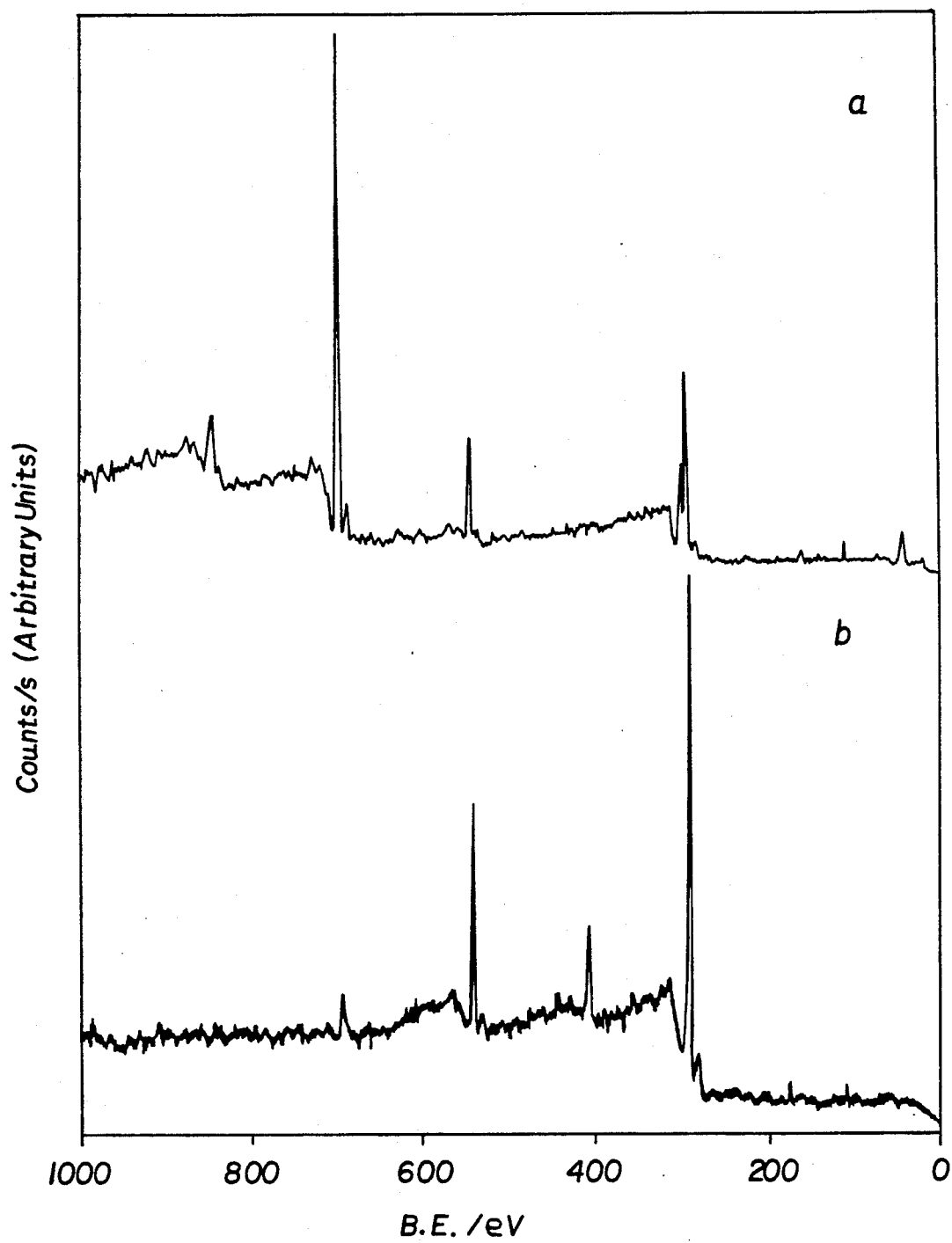
FIG. 3 is a graph showing a wide scan spectra of untreated and aminolyzed FP clad fiber.

We also examined ESCA spectra of fluoroalkyl acrylate polymer (FP) clad optical fiber. FIG. 3 depicts wide scan spectra of untreated and aminolyzed FP clad fiber. For the untreated fiber, besides $C_{ls}$ and $O_{ls}$ peaks, a strong $F_{ls}$ core level peak is observed near 700 eV. A distinct peak, though of reduced intensity, due to F(Auger) level is also seen. However, for the aminolyzed fiber, apart from the peaks due to $C_{ls}$, $O_{ls}$ and $F_{ls}$, a peak due to $N_{ls}$ is clearly seen. These results indicated that aminolysis reaction also occurred readily with fluoroalkyl acrylate ester polymers.

Following a mathematical treatment of the ESCA data, the relative peak ratios were calculated and these are tabulated in Table 2. For the PMMA clad fiber, the ratio $N_{ls}/C_{ls}$ for two different reaction periods is practically constant suggesting that the surface reaction is complete within 2.5 minutes. Accordingly, the $O_{ls}/C_{ls}$ ratio decreased with reaction time indicating the loss of —OCH$_3$ groups from the surface. With the FP clad optical fibers, approximately 90% conversion of surface ester groups to the corresponding amide occurred within 5 minutes after fibers were exposed to the reaction medium.

In conclusion, N-lithio ethylene diamine allows aminolysis to take place at lower temperatures, accelerates aminolysis of PMMA in solution and on surface, and appears to be excellent reagent for aminolysis of other acrylate ester polymers as well.

TABLE 1

| Properties of the Optical Fiber | | |
|---|---|---|
| | Type 1 | Type 2 |
| Diameter | 500 μm | 500 μm |
| Core Diameter | 465 μm | 465 μm |
| Core material | Polystyrene | PMMA |
| Cladding material | PMMA | Fluorinated acrylic polymer |
| Core ref. index | 1.60 | 1.495 |
| Cladding ref. index | 1.495 | 1.402 |
| Numerical aperture | 0.58 | 0.50 |

TABLE 2

| Fiber | Area ratio of peaks due to $N_{ls}$, $O_{ls}$, and $F_{ls}$ relative to $C_{ls}$ | | | |
|---|---|---|---|---|
| | $C_{ls}$ | $O_{ls}$ | $N_{ls}$ | $F_{ls}$ |
| PMMA untreated | 1 | 0.630 | 0 | — |
| PMMA 2.5 min | 1 | 0.499 | 0.140 | — |
| PMMA 5.0 min | 1 | 0.414 | 0.110 | — |
| FP clad untreated | 1 | 0.278 | 0 | 1.343 |
| FP clad 5.0 min | 1 | 0.486 | 0.246 | 0.127 |

Among the suitable dyes for use in the present invention are bromothymol blue, and fluoroescein, for example.

Whereas particular embodiments of the invention have been described above for purposes of illustration, it will be evident to those skilled in the art that numerous variations of the details may be made without departing from the invention as defined in the appended claims.

We claim:

1. A method of modifying the surface of an optical fiber comprising:
    providing an optical fiber having a surface composed of poly (methyl methacrylate),
    applying to the surface thereof the reaction product of a reaction effected in a substantially oxygen-free atmosphere of N-butyl lithium with ethylene diamine.
2. The method of claim 1, including
    effecting said reaction of N-butyl lithium and ethylene diamine employing on a molar basis about one part of the former to about 7 parts of the latter.
3. The method of claim 1, including
    effecting said reaction product within a sealed container.
4. The method of claim 1 wherein said applying of said reaction product to said surface of said optical fiber is effected in a nitrogen environment.
5. The method of claim 3, including
    effeciting said reaction of said N-butyl lithium and said ethylene diamine in a nitrogen atmosphere.
6. The method of claim 5, including
    effecting said reaction at about 10° C. to 40° C. for about one to two hours.
7. The method of claim 6, wherein said applying of said reaction product is effected to substantially all of the exterior surface of said optical fiber.
8. The method of claim 3, including
    effecting termination of exposure of said reaction product to said fiber by washing, and subsequently drying said fiber.
9. The method of claim 1 including utilizing amino groups introduced by applying the reaction product onto said surface of said fiber to, and subsequently modify surface of said optical fiber by binding a pH-sensitive dye with isothiocyanate functionality.
10. The method of claim 1 including,
    providing said poly (methyl methacrylate) as a cladding on said optical fiber.
11. The method of claim 9, including
    employing Bromothymol Blue dye as said pH sensitive dye.
12. The method of claim 9, including
    employing fluoroscein as said pH sensitive dye.
13. The method of claim 7, including
    applying said reaction product to said optical fiber in a substantially dry environment.

14. The method of claim 8, including
    effecting said termination of exposure of said reaction product after a period of about two to five minutes after said application.
15. The method of claim 14, including
    effecting said washing of said fiber for said termination of exposure of said reaction product by using water.
16. The method of claim 1, including
    after a period of at least about two minutes of exposure of said reaction product to said surface of said optical fiber, terminating said exposure.

* * * * *

UNITED STATES PATENT AND TRADEMARK OFFICE
CERTIFICATE OF CORRECTION

PATENT NO. : 5,077,078

DATED : December 31, 1991

INVENTOR(S) : Jules B. Puschett, Krzysztof Matyjaszewski

It is certified that error appears in the above-identified patent and that said Letters Patent is hereby corrected as shown below:

ON TITLE PAGE: Item [75]

Insert after "Matyjaszewski" --Bhalchandra Karandikar--.

Signed and Sealed this

Twelfth Day of May, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,077,078
DATED : December 31, 1991
INVENTOR(S) : JULES B. PUSCHETT ET AL.

It is certified that error appears in the above-identified patent and that said Letters Patent is hereby corrected as shown below:

On the Title Page, column 1, a third inventor --Bhalchandra Karandikar-- should be added, so as to read after "Inventors:" --Jules B. Puschett; Krzysztof Matyjaszewski and Bhalchandra Karandikar, all of Pittsburgh, Pa.--

Column 1, line 59, "methacryalte" should be --methacrylate--.

Column 2, line 43, "ad" should be --and--.

Column 4, line 20, "$_y LiOCH_3$" should be -- $_{-y} LiOCH_3$ --.

Column 5, line 12, "is" should be deleted.

Column 5, line 35, "indicated" should be --indicate--.

Column 6, line 12, "fluoroescein" should be --fluorescein--.

Claim 5, col.6, line 41, "effeciting" should be --effecting--.

Claim 9, col.6, line 55, ", and" should be deleted.

Claim 9, col.6, line 56, --said-- should be inserted before "surface".

Claim 12, col.6, line 65, "fluoroescein" should be --fluorescein--.

Signed and Sealed this

Third Day of August, 1993

Attest:

MICHAEL K. KIRK

Attesting Officer

Acting Commissioner of Patents and Trademarks